Feb. 24, 1942. H. J. MURPHY 2,274,455
LATCH MECHANISM
Filed April 9, 1940 6 Sheets-Sheet 1

INVENTOR
HOWARD J. MURPHY
BY John Todd ATT'Y.

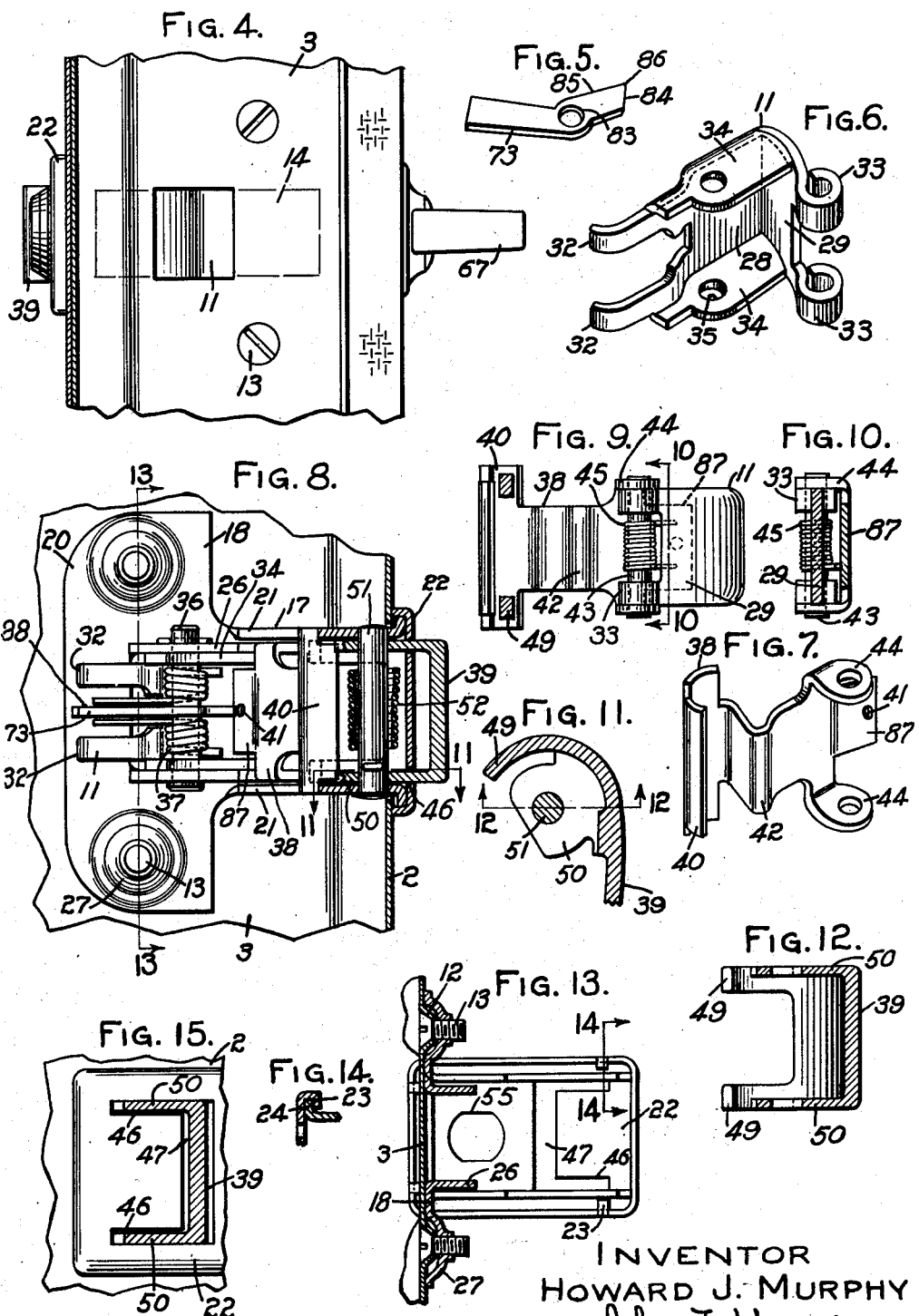

Feb. 24, 1942. H. J. MURPHY 2,274,455
LATCH MECHANISM
Filed April 9, 1940 6 Sheets-Sheet 3
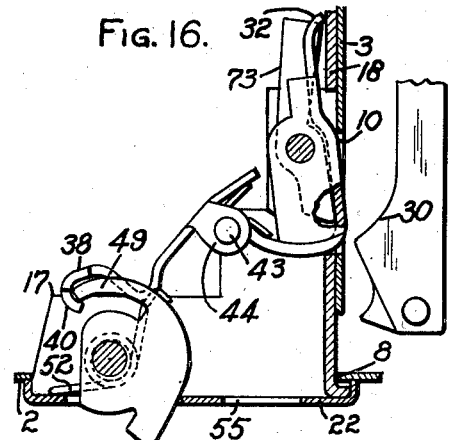
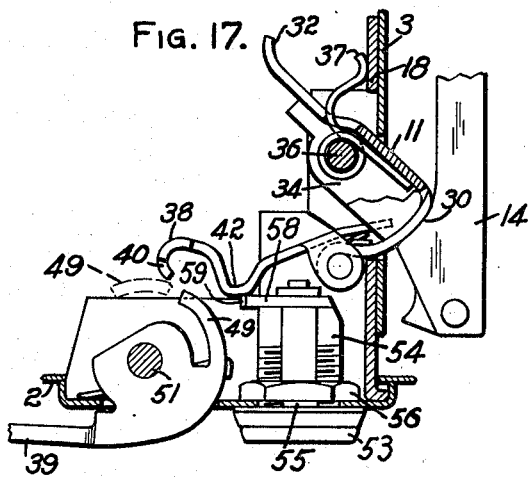
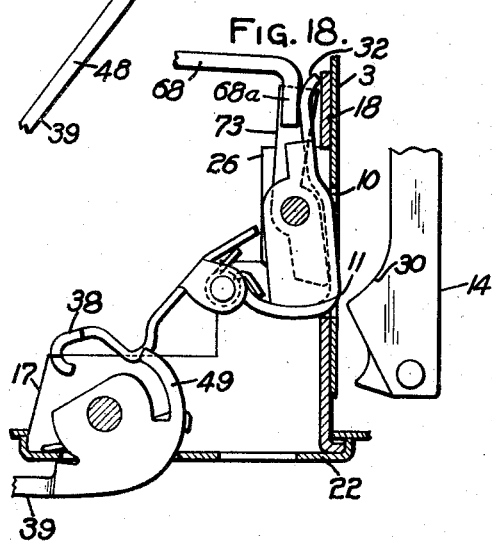
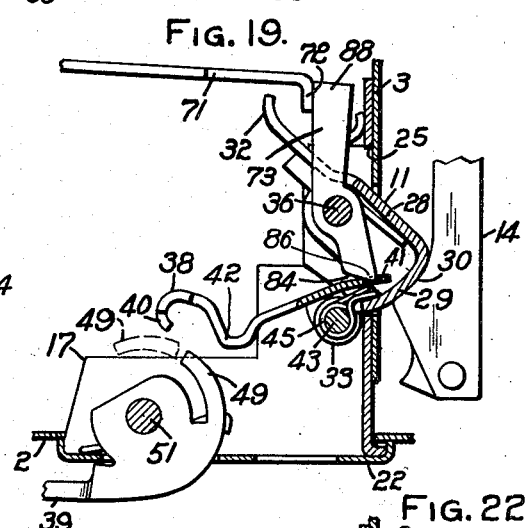
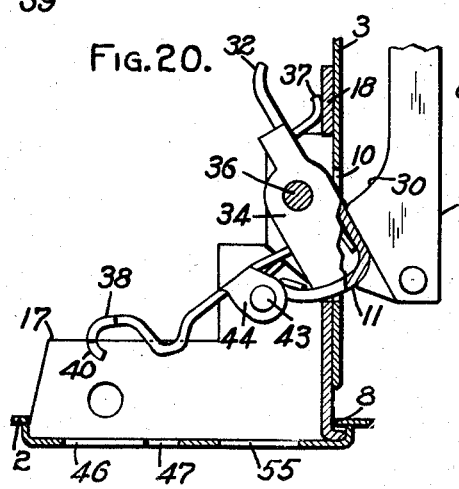
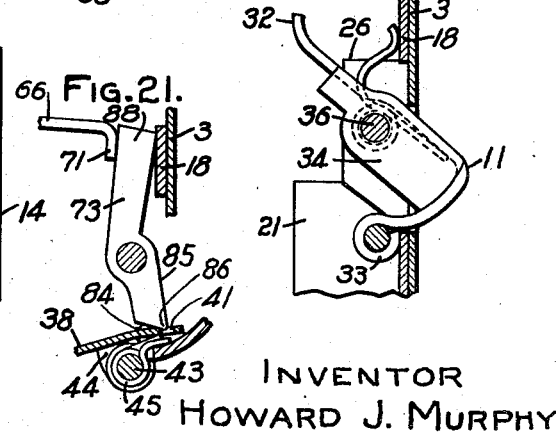
INVENTOR
HOWARD J. MURPHY
By John Jodd ATT'Y.

Feb. 24, 1942.                H. J. MURPHY                2,274,455
                            LATCH MECHANISM
                         Filed April 9, 1940          6 Sheets-Sheet 4
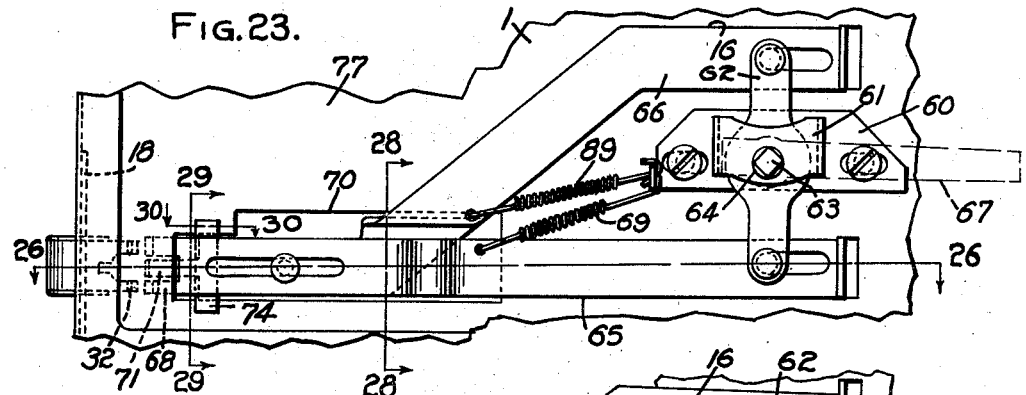
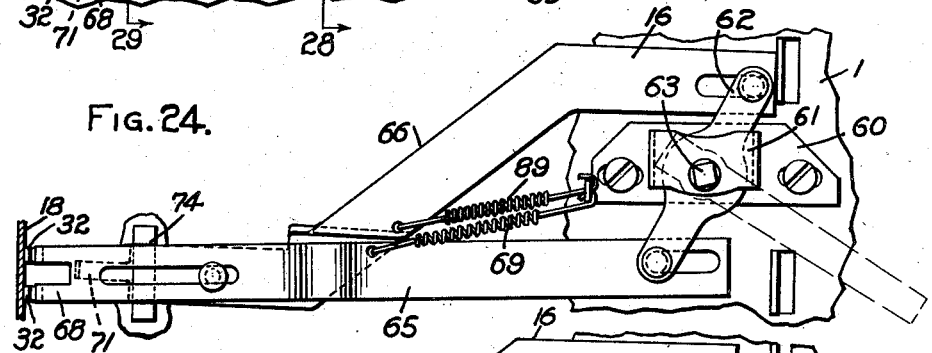
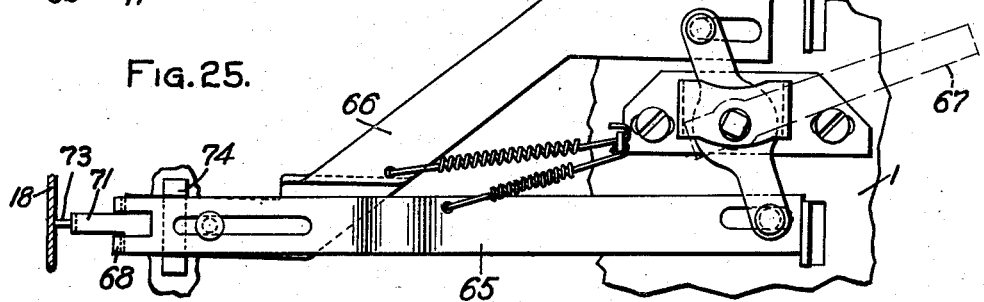
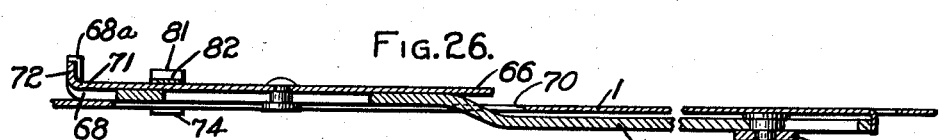
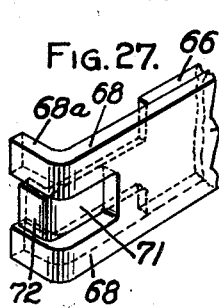
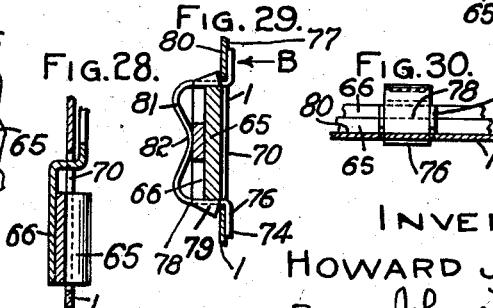
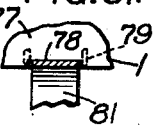
INVENTOR
HOWARD J. MURPHY
BY John Todd ATT'Y.

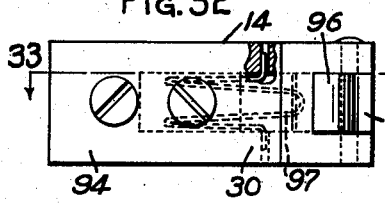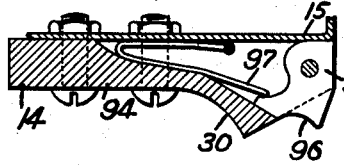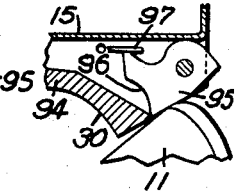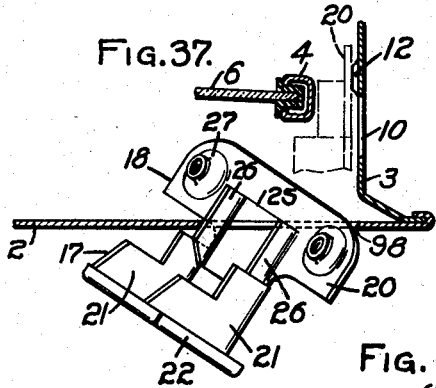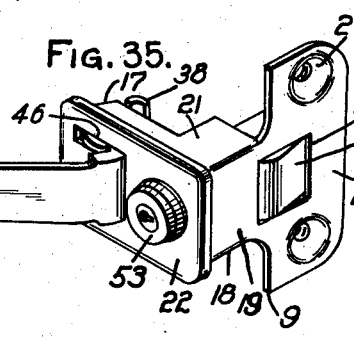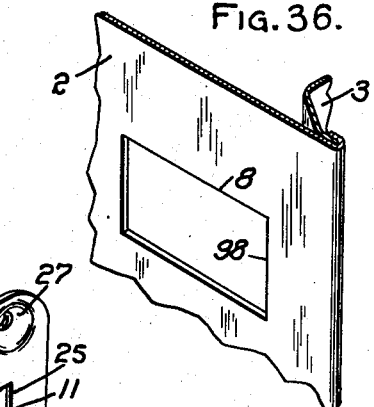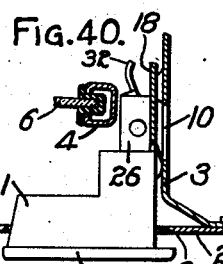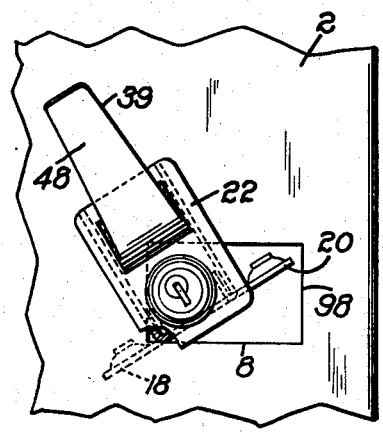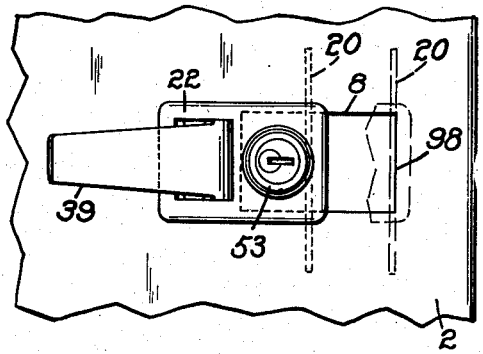

Feb. 24, 1942.   H. J. MURPHY   2,274,455
LATCH MECHANISM
Filed April 9, 1940   6 Sheets-Sheet 6

INVENTOR
HOWARD J. MURPHY
BY John Todd ATT'Y.

Patented Feb. 24, 1942

2,274,455

UNITED STATES PATENT OFFICE 2,274,455

LATCH MECHANISM

Howard J. Murphy, Greenwood, Mass., assignor to United-Carr Fastener Corporation, Cambridge, Mass., a corporation of Massachusetts Application April 9, 1940, Serial No. 328,724

5 Claims. (Cl. 70—149)

This invention relates to improvements in a latching mechanism for closures and particularly for door latches on automobile vehicles. The invention also relates to an improved method of assembling the latching mechanism with an automobile door.

Other objects and uses of my invention will be apparent from inspection of the drawings and specification hereinbelow set forth.

Referring to the drawings, in which I have illustrated preferred embodiments of my invention as applied to the door of an automobile:

Fig. 4 is an end view of the door on the line 4—4 of Fig. 1, a portion of the keeper being shown in dotted lines;

Fig. 5 is a perspective view of the locking lever operated on from the inner handle mechanism on the inner side of the door to lock the latch mechanism;

Fig. 6 is a perspective view of a latch bolt forming a part of the latch mechanism;

Fig. 7 is a perspective view of a link member forming a part of the latch mechanism;

Fig. 8 is a sectional view of the rear of the latch mechanism taken on the line 8—8 of Fig. 2;

Fig. 9 is a sectional view of the latch bolt and link member taken on the line 9—9 of Fig. 2;

Fig. 10 is a sectional view on the line 10—10 of Fig. 9;

Fig. 11 is a sectional view taken on the line 11—11 of Fig. 8;

Fig. 12 is a sectional view taken on the line 12—12 of Fig. 11;

Fig. 13 is a sectional view taken on the line 13—13 of Fig. 8;

Fig. 14 is a section on the line 14—14 of Fig. 13;

Fig. 15 is a section taken on the line 15—15 of Fig. 2 showing an opening in the outer face plate receiving a portion of the outer handle;

Fig. 16 is a diagrammatic view showing the door in unlatched position by operation of the outer handle;

Fig. 17 is a diagrammatic view showing the latch mechanism locked in latching position by the outer locking device;

Fig. 18 is a diagrammatic view showing the manner in which the door is unlatched by operation of the inner handle mechanism;

Fig. 19 is a diagrammatic view showing the manner in which the latch mechanism is locked in latching position from the inner side;

Fig. 20 is a diagrammatic view showing the door latched in safety position;

Fig. 21 is a diagrammatic view showing how rotatable movement of the locking lever is limited;

Fig. 22 is a diagrammatic view showing the means by which the latch bolt is limited in protracted position;

Fig. 23 is a plan view of the inner side of the door taken in the direction of arrow A of Fig. 2 showing the inner handle mechanism for either retracting the latch bolt or locking the latch mechanism from the inner side. The latch bolt is shown in normal protracted position;

Fig. 24 is a plan view showing the inner handle mechanism operating to retract the bolt;

Fig. 25 is a plan view of the inner handle mechanism operating to lock the bolt in protracted position;

Fig. 26 is a sectional view taken along the line 26—26 of Fig. 23;

Fig. 27 is a perspective view of the outer ends of the control rods of the inner handle mechanism;

Fig. 28 is a section taken along the line 28—28 of Fig. 23;

Fig. 29 is a section taken along the line 29—29 of Fig. 23 showing a fastener clip for aiding to maintain the control rods of the inner handle mechanism in adjacent relation to the inner side of the door;

Fig. 30 is a section taken along the line 30—30 of Fig. 23;

Fig. 31 is a section in the direction of the arrow B of Fig. 29 and showing the method of attaching the fastener clip to the inner side of the door;

Fig. 32 is a front view of a keeper plate in the direction of the arrow C of Fig. 2;

Fig. 33 is a section taken along the line 33—33 of Fig. 32;

Fig. 34 is a section showing the operation of the safety catch;

Fig. 35 is a perspective view of the unit of latch mechanism with the outer handle shown in position to retract the bolt member;

Fig. 36 is a perspective view of the outer side of the door showing the opening for entrance of the unit of latch mechanism shown in Fig. 35;

Fig. 37 shows the first step in assembling the unit of latch mechanism with the door through the outer side of the door;

Fig. 38 is a view showing the second step in assembling the parts;

Fig. 39 shows the third step in assembling the parts;

Fig. 40 shows the position of the parts before moving the unit of latch mechanism into final position relative to the sides of the door;

Figure 1:
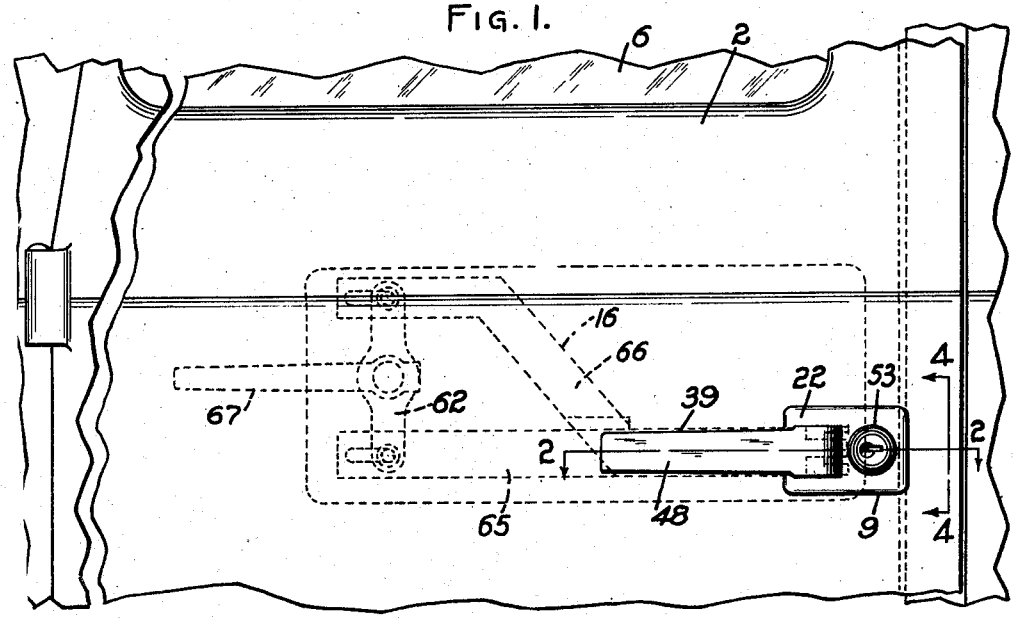
Fig. 1 is a front elevation of a portion of an automobile door showing the outer handle and other parts of my improved latch mechanism.
Figure 2:
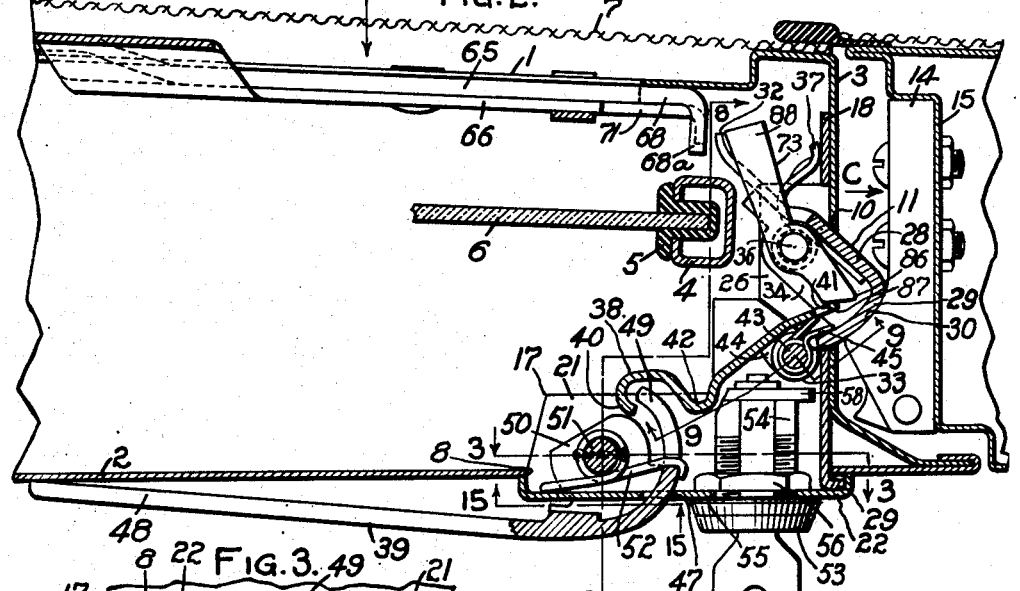
Fig. 2 is a section along the line 2—2 of Fig. 1 showing the door in unlocked latched position.

Referring to Figs. 1 and 2 of the drawings, I have shown a portion of an automobile door having spaced inner and outer sides 1 and 2 respectively and an edge 3. The door is of the type now commonly used in automobile manufacture and provides a window channel frame 4 positioned within the interior of the door in predetermined spaced relation to the sides 1 and 2 and to the edge 3. A window channel strip 5 of any well known construction is assembled with the frame 4 and provides a runway for a sheet of raisable window glass 6 in a manner well known in the art. Upholstery material 7 (Fig. 1) is mounted upon the exposed face of the inner side 1. The outer side 2 has an opening 8 which is rectangular, in my preferred form, and spaced a predetermined distance from the edge 3 to receive a unit of latch mechanism 9 (Figs. 2 and 35) during assembly thereof with the door, as will be described. The edge 3 has an opening 10 through which the bolt member 11 of the latch mechanism projects when in normal protracted position. The edge 3 also provides a pair of countersunk openings 12—12 (Figs. 13 and 37) for receiving attaching means such as the screws 13 for securing the latch mechanism in fixed assembly with the door. A striker plate or keeper 14 is secured to the door jamb 15 for cooperating latching engagement with the bolt member 11 of the latch mechanism.

An inner handle mechanism 16 is secured in assembly with the inner side 1 of the door and provides control rods protractable on operation of the inner handle and arranged in predetermined position to cooperate with the latch mechanism 9 to retract the bolt member 11 from the inner side of the automobile and also to lock the latch mechanism against retraction of the bolt member by operation of the outer handle. It will be seen, after study of the description hereinafter set forth in combination with the drawings, that one of the objects of my invention is directed to the improved assembly of the latch device with the door wherein the inner handle device including control rods to operate upon the latch mechanism to retract the latch bolt or to lock the latch mechanism from the inner side is secured to the inner side of the door and the unit of latch mechanism 9 is assembled with the door by moving it through the opening 8 in the outer side 2 of the door and fixing it in position to permit proper operation of the control rods of the inner handle upon related parts of the unit 9. Furthermore, it will be seen that the parts of the unit of latch mechanism 9 are arranged in such a novel way that assembly of the unit with the door through the opening of the outer side is unhampered by the channel frame 4.

The unit of latch mechanism 9 comprises a number of parts preassembled in operable relation to effect a compact unit. Although my preferred form of unit of latch mechanism, as illustrated in Fig. 35, comprises a definite number of component parts, it is understood that certain of these parts may be omitted or others added without departing from the broader scope of my invention.

Referring in detail to the component parts of the unit 9, I have provided a latch mechanism supporting member 17 comprising a generally flat T-shaped bolt-supporting plate 18. The plate 18 has a neck portion 19 and a head portion or attaching portion 20 extending beyond the lateral edges of the neck portion 19 on opposite sides thereof. Spaced parallel walls 21—21 extend from opposite edges of the neck portion 19 in substantially right-angular relation thereto whereby the walls 21—21 and the neck portion define a shell-like part. A face plate 22 is assembled with the shell-like part adjacent one end and extends in substantially right-angular relation to the plane of the bolt-supporting plate 18. The face plate 22, which encloses an open side of the shell-like part, is preferably secured to the same through means of lugs 23 formed integral with the edges of the face plate and bent to engage outwardly flared edges 24 of the neck 19 and the walls 21—21, as most clearly shown in Figs. 13 and 14. The face plate 22, which has a greater area than the opening 8 of the side 2, is adapted to rest adjacent the exterior surface of the side 2 when the latch is in permanent assembly with the door. The bolt-supporting plate 18 has a bolt-receiving opening 25 adapted to align with the opening 10 of the edge 3. A pair of spaced wings 26—26 formed from material taken from within the opening 25 extends from the plate 18 in substantially perpendicular relation to the plane thereof and parallel to the walls 21—21. Tubular embossments 27 are drawn from the head portion 20 of the bolt-supporting plate 18 and disposed on opposed sides of the bolt-receiving opening 25 to align with the screw-receiving openings 12 of the edge 3. The embossments 27 are internally threaded for cooperative threaded engagement with the threaded shanks of the screw means 13 to secure the unit 9 in fixed attachment to the door.

Figure 42:
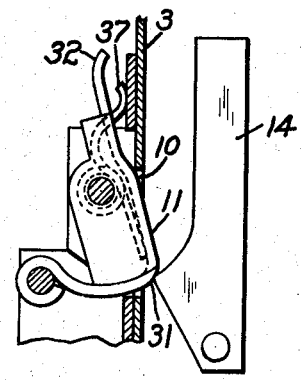
Fig. 42 is a diagrammatic view showing the cooperation of the latch bolt with the keeper during movement of the door to latched position to draw the door against the door jamb.

The bolt member 11, most clearly illustrated in Fig. 6, forming a part of the unit 9, is preferably formed from one piece of sheet metal and comprises a camming plate 28 and a curved keeper-engaging portion 29 for engagement behind a shoulder 30 of the keeper 14 when the door is in latched position. A radius 31 is preferably provided at the junction of the camming portion 28 and the keeper-engaging portion 29 to draw the latch bolt against the keeper during engagement of the bolt member with the keeper in closing the door (Fig. 42), as will be understood by those skilled in the art. Spaced narrow extensions or tail portions 32 extend outwardly from one end of the camming portion 28 and are adapted to be engaged by part of the inner handle mechanism upon operation of the inner handle to retract the bolt. Bearings 33—33 (Fig. 6) are formed adjacent the keeper-engaging portion 29 and provide means for coupling the bolt member to another part of the latch mechanism, as will be described. Also, movement of the bolt in protracted position is limited by engagement of the bearings with the plate 18, as shown in Fig. 22. Spaced parallel side portions 34—34 extend outwardly from one side of the camming portion 28 in substantially perpendicular relation thereto and provide aligned openings 35 (Fig. 6). The bolt member 11 is mounted for pivotal movement relative to the edge 3 of the door through means of the pin 36 which extends through the wings 26—26 of the bolt-supporting plate 18 and the openings 35—35 of the bolt member. A spring member 37 assembled with the pin 36 operates to hold the bolt member normally in protracted position.

A link member 38 comprises a part of the unit 9 and cooperates mechanically with the bolt member 11 and an outer handle 39 to retract the bolt member on operation of the outer handle. The link member 38, as most clearly shown in Fig. 7, provides a hook-shaped end 40 and an opening 41 adjacent an opposite end. The link member has a cam means in the form of a fold 42, in my preferred form, extending outwardly from one side for mechanical cooperation with the outer locking device in a manner to be described. The link member 38 is secured to the bolt member 11 through means of a pin 43 extending through the bearings 33 of the bolt member and wings 44 extending outwardly from one side of the link member. Thus the link member is attached to the bolt member 11 so as to be movable fore and aft on retraction and protraction of the bolt member and at the same time it is pivotally movable relative to the bolt member independently of its fore and aft movement. A spring member 45 assembled with the pin 42 cooperates with the link member and the bolt member to maintain the link member in predetermined position relative to the outer handle 39 for a purpose to be described.

The face plate 22 has an opening for receiving a portion of the outer handle 39. This opening is of C shape and comprises, as most clearly shown in Fig. 15, a pair of spaced parallel slots 46—46 and a slot 47 connecting the slots 46 at their ends. The outer handle has a manually operative portion 48 disposed outside the side 2 in a horizontal direction and spaced from the side 2 a distance sufficient to enable the handle to be grasped by the fingers of an operator. The handle has an actuating portion in the form of spaced side-by-side bowed fingers 49—49 at one end extending through the connecting slot 47 and normally positioned for cooperative engagement with the hook-shaped end 40 of the link member 38 on actuation of the handle. The outer handle has spaced parallel wing portions 50—50 extending through the slots 46—46 and the handle is secured in rotative assembly with the latch mechanism through means of the pivot pin 51 extending through the side walls 21 of the latch-supporting member and the wing portions 50. A spring member 52 assembled with the pivot pin 51 cooperates with the face plate 22 and handle 39 to maintain the handle in normal position in close relation to the side 2 of the door, as most clearly shown in Fig. 2. It will be seen that as a result of providing the C-shaped opening in the face plate 22 to receive portions of the outer handle, the openings are almost entirely taken up by said portions thus preventing unauthorized entrance of a tool means through the face plate to tamper with the latch mechanism.

In operation of the latch mechanism to retract the bolt by operation of the outer handle, the outer handle 39 is grasped and pulled outwardly away from the door thus causing the bowed fingers 49—49 to move in a predetermined arc to engage within the hook-shaped end 40 of the link member (Fig. 16). As a result of this action the link member is pulled forward in a direction generally away from the edge 3 pulling the bolt member to retracted position, as most clearly shown in Fig. 16. When pressure on the outer handle for retracting the bolt is released, the handle returns to normal position under the tension of the spring 52 and the bolt member returns to normal protracted position under the force exerted by the spring 37.

Figure 3:
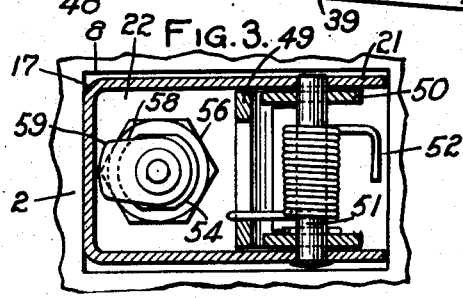
Fig. 3 is a section along the line 3—3 of Fig. 2 and showing the locking dog of the outer locking device.

The unit of latch mechanism 9, in my preferred form, also includes an outer locking device 53 assembled with the face plate 22 and providing an externally threaded shank 54 projecting through an opening 55 of the face plate 22 (Fig. 2) and secured in assembly with the face plate by the nut member 56. A rotary key plug (not shown) is disposed within the sleeve 54 and movable on operation of the key 57 (Fig. 2). A locking dog in the form of an eccentric key 58 is assembled with the plug at the inner end of the locking device and disposed in predetermined relation to the fold 42 of the link member 38. The eccentric key 58 provides a camming portion 59 (Fig. 3) engageable with the fold 42 of the link member on operation of the lock to move the link member out of the line of movement of the bowed fingers 49, as most clearly shown in Fig. 17, thereby preventing actuation of the latch mechanism by operation of the outer handle.

The inner handle device 6, in my preferred installation, comprises a plate member 60 secured to the inner side 1 of the door. A plate 61 is secured in assembly with the plate 60 in spaced relation thereto and a rotatable lever 62 is secured in assembly with the inner side 1 between the plates 60 and 61 and provides an actuating shaft 63 extending through an opening 64 of the plate 61. The lever 62 is secured at opposed ends in mechanical connection to control rods 65 and 66 in a way to effect protraction of the control rod 65 when the lever 62 is rotated in a clockwise direction, viewing Fig. 23, and protraction of the rod 66 when the lever 62 is rotated in a counterclockwise direction. A manually operated means such as the inner handle 67 is mechanically engaged with the shaft 63 so as to rotate the lever 62 in a desired direction by moving the handle downwardly or upwardly. The control rod 65 is adapted to retract the bolt member 11 and provides fingers 68—68 at its end remote from that in connection with the lever 62. The fingers 68—68 provide angularly extending free end portions 68ª in alignment with the tail portions 32—32 of the latch bolt member and normally spaced therefrom, as most clearly shown in Figs. 2 and 23. Thus when the inner handle 67 is turned downwardly, looking at Fig. 23, the lever 62 is rotated in a clockwise direction moving the control rod 65 forward to engage the ends 68ª with the tail portions 32 of the bolt member thus moving the tail portions in the direction of the edge 3 of the door so as to retract the bolt, as most clearly shown in Fig. 18. Retraction of the bolt is limited upon abutment of the tail portions 32 with the bolt-supporting plate 18, as shown in Figs. 16 and 24. When pressure upon the inner handle 67 is released, a spring member 69 returns the control rod 65 to normal position and the bolt member returns to normal protracted position under the force of the spring 37. It will be seen that both the control 65 and 66 are bent intermediate their ends so as to extend from outside the door through the opening 70 (Fig. 23) of the side 1 into the interior of the door.

The control rod 66 is adapted to effect locking of the latch mechanism from the inner side of the automobile upon movement of the handle 67 in an upward direction and is adapted for reciprocable movement relative to the control rod 65 independently thereof. The control rod 66 has a finger 71 having an angularly turned portion 72 at its outermost end engageable with a locking lever 73 on protraction of the rod 66 to lock the latch mechanism against retraction of the latch bolt by operation of the outer handle. As a means for aiding to maintain the control rods 65 and 66 in close relation to the side 1 and to each other adjacent their outer ends, I have provided a fastener member 74 which is secured in snap fastener engagement with the side 1 through the aperture 70 thereof. The snap fastener member, as most clearly shown in Fig. 29, has support-engaging portions 76 engaging the exterior surface 77 of the inner side and yieldable attaching portions 78 extending through the opening 75 and providing shouldered wings 79 engaging an inner surface 80 of the side 1 to secure the fastener member in assembly with the side 1. A connecting portion 81 joins the attaching portions 78—78 at their ends away from the support-engaging portions 76 and has a yieldable depressed portion 82. The control rods 65 and 66 are maintained in assembly with each other and with the side 1 between the depressed portion 82 and the inner surface 80 of the side 1 (Fig. 29).

The locking lever 73, in my preferred form, forms a part of the unit of latch mechanism 9. The locking lever 73 is mounted for relative pivotal movement and fixed in assembly with the latch bolt 11 between the side walls 34—34 by the pin 36 which extends through an opening 83 (Fig. 5) formed intermediate the ends of the lever 73. The transverse edge 84 at one end of the locking lever is inclined relative to an adjacent lateral edge 85 (Fig. 5) to form a point 86 which is arranged in predetermined position relative to the end 87 of the link member 38 and engageable with the link member to effect locking of the latch mechanism as hereinbelow described. The point 86 has a radius, as shown in Fig. 19, to aid disengagement of the locking member from the link member, as hereinbelow described.

In locking the latch mechanism from the inside of the automobile, the inner handle 67 is raised upwardly, as shown in Fig. 25, thereby protracting the control rod 66 to engage the angularly turned end 72 thereof with the end 88 of the locking lever 73. During this action the inclined edge 84 of the locking lever engages the end 87 of the link member 38 thereby rotating the link member against the tension of the spring 45 and moving the hook-shaped portion 40 upwardly out of the line of movement of the fingers 49 of the outer handle. At this time the point 86 of the locking lever has moved into alignment with the opening 41 of the link member and is received within the opening 41 as a result of the tendency of the spring 45 to return the link member to normal position and cooperates with the walls of the opening 41 to maintain the link member in raised position, as most clearly shown in Fig. 19. When pressure upon the inner handle for actuating the lever 73 is released, the control rod 66 is returned to normal position by action of a spring 89. In Fig. 21 I have illustrated the means by which rotation of the locking lever 73 during actuation thereof is limited by abutment of its end 88 with the bolt-supporting plate 18.

Figure 41:
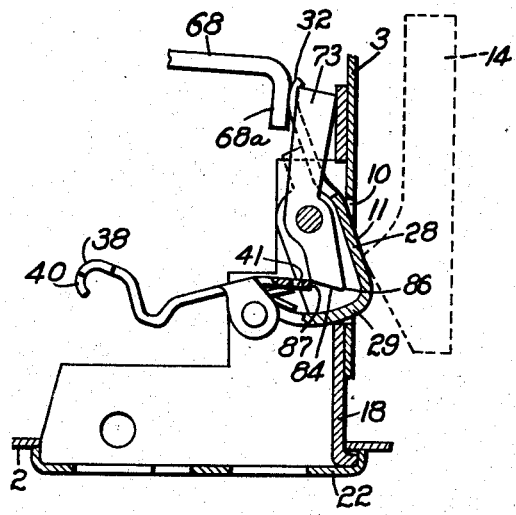
Fig. 41 is a diagrammatic view showing the manner in which the locking lever is released by retraction of the latch bolt.

Release of the locking lever is effected simultaneously with retraction of the latch bolt as by actuation of the inner handle. Thus during retraction of the bolt the link member 38 moves forwardly with the bolt and carries the locking lever with it until the end 88 of the locking lever abuts the bolt-supporting plate 18, as shown in Fig. 41. Continued retraction of the latch bolt moves the link member forwardly and upwardly and during this movement the wall of the opening 41 of the link member rides over the radius of the point 86 thereby disengaging the opening 41 from the point 86. As the bolt returns toward normal protracted position, the end 87 of the link member again engages the inclined edge 84 substantially as shown in Fig. 41 moving the link member in the direction of the edge 3 of the door until the bolt is completely protracted, at which time the link member and locking lever will have assumed the normal relative positions illustrated in Fig. 2. Similarly, if, when the door is in open position, the locking lever should be moved into locking position, engagement of the bolt member with the keeper, as shown in dotted lines in Fig. 41, during closing of the door, will unlock the mechanism. Thus it is impossible for an operator of the vehicle to lock the doors leaving his keys inside.

Figure 43:
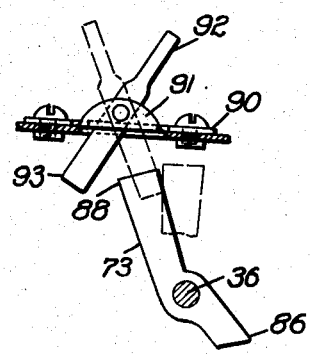
Fig. 43 is a view partly in section showing a modified form of inner locking mechanism.
Figure 44:
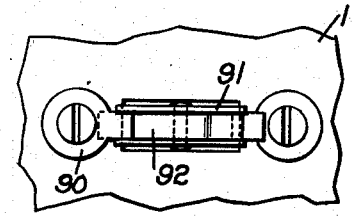
Fig. 44 is an elevation of the locking mechanism shown in Fig. 43.

In Fig. 43 and 44 I have illustrated a modified form of locking mechanism operable from the inner side of the door to move the locking lever 73 into locking engagement with the latch mechanism. My modified form of locking device includes a supporting member 90 secured to the side 1 of the automobile door and carrying spaced upstanding wings 91. A manually operable lever 92 is pivotally assembled with the supporting member 90 between the wings 91 and has an end portion 93 in position to engage the end 88 of the locking lever to move the lever into locking position on manual operation of the lever 92.

The keeper 14 may be of any well known construction, but I have preferably provided one comprising a block 94 having an outwardly extending portion providing a shoulder 30 facing in the direction of the inner side 1 of the door (Fig. 2) and a safety catch 95 pivotally assembled with the keeper and providing a shoulder 96 to engage the bolt member in safety position, as shown in Fig. 20. The safety catch 95 is maintained in bolt-engaging position under the tension of a spring 97 and is rotatable against the tension of the spring when engaged by the bolt member during closing of the door, as most clearly shown in Fig. 34.

The method of assembling my improved latch mechanism with a door is relatively simple and directed particularly to satisfying the demand of automotive manufacturers for a latch mechanism which is adaptable to high speed assembly. In the first step the inner handle device 6 including the control rods 65 and 66, in combination with the means for actuating the same, are secured to the inner side 1 of the door. Next the unit of latch mechanism 9 is assembled within the door through the opening 8 of the side 2. As a result of the fact that the greatest dimension of the head portion 20 is greater than the distance between diametrical opposed corners of the rectangular opening 8, the head portion 18 is moved through the opening through inserting one end thereof into the opening at one corner, as most clearly shown in Fig. 37, and then moving the opposite end thereof into the opening, as shown in Fig. 38. During insertion of the head portion 18 through the opening, the head portion is positioned diagonally relative to the opening 8, as shown in Fig. 38. Next, viewing Fig. 38, the unit 9 is rotated in a counterclockwise direction for approximately 45° to dispose the head portion 20 in vertical position, as shown in dotted lines in Fig. 39. After this action, the latch unit is moved to the right, looking at Fig. 39, to dispose the unit adjacent the wall 98 of the opening 18, which is nearest to the edge 3 of the door. Before moving the latch mechanism into final position, it is necessary to retract the bolt by operation of the outer handle due to the fact that the cross-sectional dimension of the unit 9 through the bolt when the bolt is in protracted position is greater than the distance between the window channel frame 4 and the edge 3. Thus after the bolt has been retracted, the unit is pushed inwardly toward the side 1 until the unit is in proper position with the embossments 27—27 in alignment with the openings 12—12 of the edge 3 and the bolt member in alignment with the opening 10 of the edge 3, at which time the bolt member springs outwardly through the opening 10 into normal protracted position. Finally the unit 9 is secured in fixed attachment to the door by inserting the screws 13 through the openings 12 of the edge into threaded engagement with the threaded embossments 27—27 of the bolt-supporting plate 18. After this action the parts of the unit 9 are in proper position for operation thereof by the control rods 65 and 66 of the inner handle device.

Thus it will be seen that by my invention the latch mechanism may be attached to the door quickly and easily from a position entirely outside the door. Furthermore, the unit of latch mechanism 9 may be quickly detached from the door by an operation reverse to that of its insertion should it be necessary to repair any part of the same. As a result, it is not necessary to take down the upholstery panel or other parts of the door in order to repair the latch mechanism.

Although I have illustrated and described preferred embodiments of my invention, I do not wish to be limited thereby because the scope of my invention is best defined by the following claims.

I claim:

1. A latch mechanism comprising parts preassembled in the form of a unit including a latch-supporting member having a face plate applicable to a side of a door and an attaching plate extending in angular relation to the plane of said face plate, said attaching plate being applicable to an edge of said door and having openings for receiving attaching members and a bolt-receiving opening therein, a bolt member pivotally mounted on one side of said attaching plate having a keeper-engaging portion projecting through said opening of said bolt-supporting plate in normal protracted position, a link member pivotally attached to said bolt member, and a handle part pivotally mounted to said latch supporting member and extending through said face plate member, said handle part having an actuating portion movable in a predetermined arc on operation of said handle to engage said link member to move said link member for retracting said bolt, and a lock assembled with said mechanism including a rotatable dog engageable with said link member on operation of said lock to move said link member out of the line of movement of said actuating portion of said handle.

2. A latch mechanism comprising parts preassembled in the form of a unit including a latch-supporting member applicable to the hollow interior of a door, said latch-supporting member comprising a shell portion at one end having an end wall and spaced sidewalls integral with said end wall and extending on one side thereof, an attaching plate forming a continuation of said end wall, said attaching plate being applicable to an edge of said door for securing said unit to said door and having a bolt-receiving opening therein, a bolt-member mounted on one side of said attaching plate having a keeper-engaging portion projecting through said opening of said attaching plate in protracted position, a link member attached to said bolt member, and a movable handle assembled with said latch-supporting member within said shell portion, said handle member and said link member having means interengageable on operation of said handle member to move said link member to retract said bolt.

3. A latch mechanism comprising parts preassembled in the form of a unit including a latch-supporting member applicable to the hollow interior of a door, said latch-supporting member comprising a shell portion at one end having an end wall and spaced sidewalls integral with said end wall and extending on one side thereof, a face plate secured to said shell portion to cover an open side thereof, said face plate being applicable to a side of said door, an attaching plate forming a continuation of said end wall, said attaching plate being applicable to an edge of said door for securing said unit to said door and having a bolt-receiving aperture therein, a bolt member pivotally mounted on one side of said attaching plate having a keeper-engaging portion projecting through said opening of said attaching plate in protracted position, a link member pivotally attached to said bolt member, and a handle member pivotally assembled with said latch-supporting member between said sidewalls of said shell portion, said handle member extending through said face plate, and said handle member and link member having means interengageable on operation of said handle to move said link member to retract said bolt.

4. In a hollow door having spaced sides and an edge, said edge and at least one of said sides each having an opening; a door latch mechanism, said mechanism including a latch-supporting member extended into the interior of said door only through said opening of said side, said latch-supporting member having an attaching plate abutting said edge of said door, screws extending through said plate and said edge to secure said latch-supporting member to said door and said screws at said edge being the only fastener members extending through said parts, said attaching plate having an opening in alignment with said opening of said edge, a bolt member mounted on one side of said attaching plate, said bolt member having a keeper-engaging portion projecting through said aligned openings of said parts in projected position thereof, and said mechanism including means for actuating said bolt to retract the same.

5. In a hollow door having spaced sides and an edge, said edge and at least one of said sides having an opening; a door latch mechanism, said mechanism including a latch supporting member extended into said door only through said opening of said side, said latch-supporting member having a shell portion comprising an end wall and spaced side walls extending on one side of said end wall, an attaching plate forming a continuation of said end wall and abutting said edge of said door, screws extending through said attaching plate and said edge to secure said latch-supporting member to said door and said screws at said edge being the only fastener members extending through said door and said latch-supporting mechanism, said attaching plate having an opening in alignment with said opening of said edge, a bolt member mounted on one side of said attaching plate, said bolt member having a keeper-engaging portion projecting through said aligned openings of said parts in projected position thereof, and a face plate in assembly with said shell portion and disposed on the outer surface of said apertured side of said door.

HOWARD J. MURPHY.